June 23, 1959     C. M. KINZER     2,891,334

BLADE MEANS

Filed Oct. 31, 1955

INVENTOR.
C.M. KINZER

BY John H. Widdowson

ATTORNEY

United States Patent Office 2,891,334
Patented June 23, 1959

2,891,334

BLADE MEANS

Clarence M. Kinzer, Sedgwick, Kans.

Application October 31, 1955, Serial No. 543,783

6 Claims. (Cl. 37—143)

This invention relates to blade apparatus. In a more specific aspect, this invention relates to working blade apparatus mountable on the front end of a vehicle. In a still more specific aspect, this invention relates to convertible blade apparatus which is preferably mounted on the forward boom apparatus of a tractor equipped with such for manure loader apparatus, such blade being useable as a bull dozer type-blade for moving dirt, grading roads or lanes, and for digging shallow ditches, and the like, and such blade being easily convertible to snow plow apparatus.

Bull dozer, snow plow and ditch digging equipment are all well known in the art, and equipment combining two or more of these features is known. However, none of the prior equipment can be used with the usual forward boom means on farm tractors, which is available to operate the scoop of a manure or dirt loader means on farm tractors, and few farmers can afford bull dozer equipment and its auxiliary attachments. The new blade apparatus of my invention can be mounted on and used with the forward boom apparatus of the usual relatively small farm tractor, which most farmers have today. While the resulting bull dozer, snow plow or ditch digger will not do the heavy excavating or deep ditch digging of a typical bull dozer, it does provide the farmer with means to grade roads or lanes, plow snow, move dirt, and the like, and dig shallow ditches, and the like. These operations are of tremendous value to the farmer.

I have invented new blade apparatus for the forward end portion of a vehicle. The new apparatus of my invention has a main blade which is hinged in its central portion, making the blade disposable linearly, or pointedly with the blade sections folded rearwardly at the hinge. The main blade is cut-away in its central portion, preferably notch-like and a removable insert blade member is mountable in such cut-away portion. Means are provided for connecting the insert blade member to the main blade, and means are provided to mount the blade assembly on the forward end of the vehicle. One preferred removable insert member is of shape such that when mounted the assembled working blade is pointed for use in plowing snow, etc., and another preferred removable insert is of shape such that when mounted the assembled working blade is straight for grading operations, etc. In the latter instance preferred mounting means of my invention is used to mount the blade on the front end of the vehicle at an angle with the ground so that shallow ditches can be dug conveniently with the apparatus.

It is an object of this invention to provide new blade apparatus.

It is another object of this invention to provide new working blade means which is mountable on the front end of a vehicle.

Still another object of this invention is to provide new convertible blade apparatus preferably for mounting on the forward boom apparatus of a tractor equipped with such for manure loader apparatus, such blade and tractor combination being useable with one blade position to grade and level, etc., and with the blade converted being useable for plowing snow, and the like.

Other objects and advantages of the new blade apparatus of my invention will become apparent to those skilled in the art upon reading this disclosure.

Drawings accompany and are a part of this disclosure. The drawings depict preferred specific embodiments of the new blade apparatus of my invention, and it is to be understood that such drawings are not to unduly limit the scope of my invention.

Figure 1:
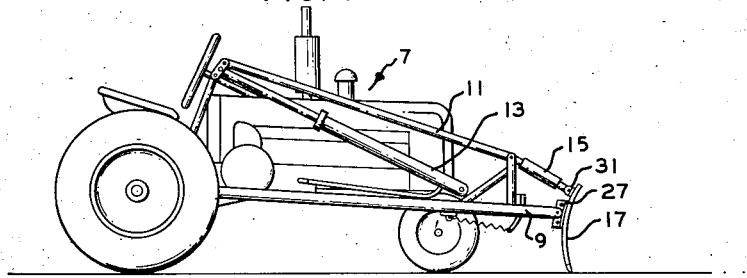
Fig. 1 is a side elevation view of a tractor with preferred blade means of my invention mounted on the boom means thereof.

Following is a discussion and description of my invention made with reference to the drawings whereon the same reference numerals are used to indicate the same or similar parts or structure. The discussion and description is of preferred specific embodiments of the new blade apparatus, and it is to be understood that such is not to unduly limit the scope of my invention.

In Fig. 1 tractor 7 is equipped with usual boom means used to elevate a manure loader scoop or bucket, comprising lower boom arms 9, one on each side, and upper boom arm 11, one on each side. Hydraulic motors 13, usually one on each side, raise and lower the booms upon operation, and hydraulic motor 15 is centrally mounted on transverse boom members which connect the side boom arms, motor 15 normally being used to support and position the scoop or bucket relative to the ground. The usual trip latch means of manure loader apparatus is not used in the new combination apparatus assembly of my invention. It does not interfere with my apparatus and can be left in place on the tractor boom means, when the manure loader bucket or scoop is removed so that the new blade apparatus of my invention can be mounted on the booms in place thereof.

The new blade apparatus of my invention has two mirror image sections 17 and 19 which are suitably hinged together preferably in their inner and lower end portions such as by hinge 21. This allows the main blade sections 17 and 19 to be disposed linearly as in Figs. 1, 2 and 5, or pointedly as in Fig. 3. The blade is made convertible by use of insert blade sections 22 and 23 which fit into the notch between sections 17 and 19 resulting from cutting away an upper portion of the inner ends of the outer blade sections 17 and 19. Insert blade member 22 preferably has a concave working surface matching the preferred concave contour of blade sections 17 and 19, including the lower blade end or knife portion 25 which contacts the ground in operation. Insert blade member 23 is preferably pointed and concavely curved on its working surfaces to match the concave working surfaces of the sections 17 and 19, and to provide for a pointed blade assembly for plowing snow. These blade sections can be made of any suitable material, preferably metal with knife portion 25 preferably made of hard steel.

Figure 2:
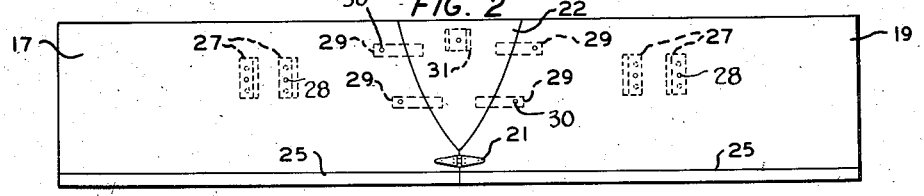
Fig. 2 is an enlarged front elevation view of the blade apparatus of Fig. 1.
Figure 3:
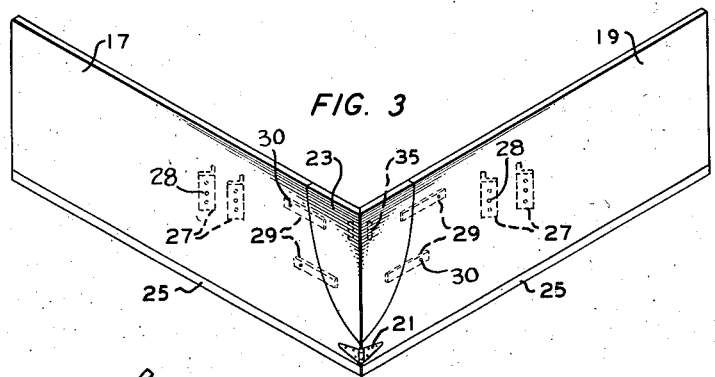
Fig. 3 is a front elevation view of the same blade apparatus converted to a snow plow type blade.
Figure 4:
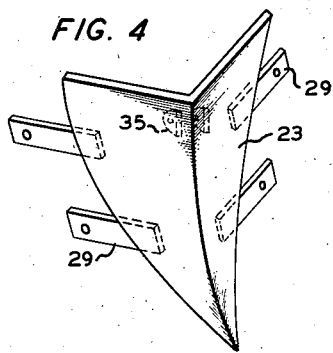
Fig. 4 is a perspective view of the central insert portion of the blade of Fig. 3.
Figure 5:
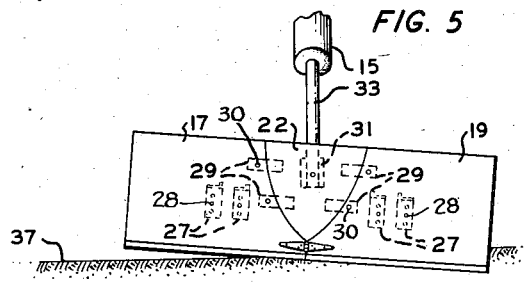
Fig. 5 is a front elevation view of the new blade apparatus of my invention disposed and mounted at an angle in position desired for digging shallow ditches.

Bracket connecting means 27 are preferably pivotally mounted as shown on blade sections 17 and 19 by bolt means 28 passing therethrough and through apertures in the blade sections. The single central mounting pin or bolt 28 for brackets 27 through sections 17 and 19 (as shown in Figs. 2, 3 and 5 in solid lines) is a preferred mounting means. Brackets 27 have portions which extend rearwardly which are provided for mounting the blade assembly on the ends of booms 9. The brackets 27 preferably have a plurality of spaced holes for the blade mounting bolts 28 so that blade height and position can easily be varied. These spaced holes are shown in dotted lines in Figs. 2, 3 and 5 on either side of the mounting pin or bolt 28, preferably only one bolt 28 on each bracket holding brackets 27 on moldboard sections 17 and 19. The holes in dotted lines indicated on either side of these bolts 28 (Figs. 2, 3 and 5) are in the brackets 27 themselves, and are for positioning the brackets higher or lower relative to the moldboard sections than that position shown in the drawings (Figs. 2 and 3). With the booms 9 on the same level, as is usual, brackets 27 can then be mounted at different levels relative to the moldboard sections 17 and 19 to tilt the moldboard in the manner shown in Fig. 5. The outer brackets 27 are used to accomplish this. The central or middle bolt means 28, of course, loosely connects the brackets 27 and moldboard sections 17 and 19 with the bolt means 28 loosely mounted in the mounting holes through the brackets, so that pivoting about a vertical axis is provided to result in being able to position the sections 17 and 19 as shown in the drawings. The rearwardly projecting portions of the brackets preferably have spaced holes to receive the bolts for mounting on the ends of the boom. This is shown in Fig. 1 where boom 9 is mounted in the middle hole. These pivotally mounted bracket means with a plurality of mounting positions have been found to be very advantageous, allowing for mounting the blade in a variety of positions and at different heights. Like the bolt means connecting the brackets 27 and moldboard sections 17 and 19, the bolts connecting booms 9 to brackets 27 are preferably loosely mounted. The play resulting from such loose connections allows for positioning the moldboard in the desired positions shown in the drawings, and has been found advantageous to provide give when the moldboard in use strikes rocks, etc. These features are used to position the blade assembly at an angle with the ground for ditch digging as shown in Fig. 5. As shown in Figs. 2, 3 and 5, two sets or pairs of like brackets 27 are used. The inner brackets 27 are used to mount the blade assembly on boom arms 9 when the blade is linearly disposed as in Fig. 1, and the outer brackets 27 are used to mount pointedly as shown in Fig. 3. The booms 9 move up and down in operation as regulated by motors 13 to vertically position the moldboard as desired, and the moldboard is pivoted about the horizontal bolt means connecting the booms 9 and brackets 27 (Fig. 1) as dictated by motor 15.

The insert members 22 and 23 have projecting arms 29 mounted thereon in any suitable manner such as by welding. The outer ends of members 29 have holes therethrough which correspond to holes in blade sections 17 and 19, and bolt means 30 passing through these corresponding holes joins the three blade sections together into a rigid blade assembly in each instance.

Figure 6:
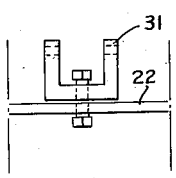
Fig. 6 is an enlarged cut-away top view of the central section of the blade of Figs. 2 and 5.

Insert member 22 has a pivoted bracket 31 to receive and mount the piston rod 33 of motor 15, so that motor 15 can be used to support and tilt the blade forward and backward when mounted for ditch digging as in Fig. 5. The single pin or bolt through member 22 for mounting of bracket 31 to pivot same shown in Figs. 2 and 5 in solid lines is preferred. The position to which bracket 31 is turned upon ditch digging use is shown in Fig. 5. The bracket 35 on insert 23 need not be pivoted to the member 23, since the blade is usually not tilted in snow plowing operations, but such can be done, if desired. Fig. 6 shows in detail, a preferred mounting of lug 31 on member 22 by the bolt means therethrough.

Figs. 1 and 2 show the desired blade assembly for road grading, dirt moving, etc., operations. Fig. 3 shows the blade converted for snow plowing operation. Fig. 5 shows the blade mounted at an angle for shallow ditch digging, ground level being indicated at 37. While these are particularly valuable uses, many other uses of my new blade assembly can be made.

As will be evident to those skilled in the art, various modifications of the invention can be made, or followed, in the light of this disclosure and discussion, without departing from the spirit or scope of the disclosure or from the scope of the claims.

I claim:

1. Blade means for hydraulically operated tractor boom means having a boom on each side of said tractor and a centrally positioned hydraulic motor mounted to operate forward of said tractor, comprising, in combination, a two-section blade member having a concave working surface the sections of which are hingedly joined in the lower portion of their inner end portions, said blade sections being positionable in linear relation or in pointed relation, each of said blade sections being an end blade section and having like portions cut away in an upper portion of their inner end portions, a removable insert blade section member snugly mountable between and on the end blade sections to fill said space left by said cut-away portions and to form a rigid three section blade, means to attach said insert member to said end blade sections, attachment means on said removable insert member having portions to mount said blade means on the outer end portion of said centrally positioned hydraulic motor of said boom means, and attachment means positionably mounted on said end blade sections to in turn mount said blade means on the outer end portions of said booms with said end blade sections positioned in pointed relation or in linear relation, said last-named attachment means being pivotally mounted on said end sections and connectable to said booms to position said blade means at an angle with the ground when mounted in said last-named linear relation position.

2. The apparatus of claim 1 wherein said insert member is a concave triangular-like section connectable to said end blade sections to linearly dispose said three blade sections, and wherein said means to attach said insert member on the outer end portion of said motor is pivotally mounted thereon.

3. The apparatus of claim 1 wherein said insert member is a pointed triangular-like section connectable to said end blade sections to pointedly dispose said three blade sections.

4. Blade means for mounting on the front end portion of tractor means, which comprises, in combination, a main blade member hingedly connected in the lower central portion thereof, said blade being disposable linearly or pointedly, said blade member being cut away notch-like in the upper central portion, a removable insert blade member having mounting means therewith, said insert blade member mountable in said notch and connectable to said main blade member by said mounting means to form a rigid blade, and attachment means on said insert blade member and said main blade member in the outer end portions of said main blade member connectable to said front end portion of said tractor to mount the blade assembly on said front end portion of said tractor with said blade assembly pointedly or linearly disposed, said attachment means being connectable to position said blade at an angle with the ground when mounted on said tractor in said last-named linearly disposed position.

5. The apparatus of claim 4 wherein said insert member is a triangular-like member having a surface contour like that of said main blade member and connectable to said main blade member to linearly dispose said blade assembly.

6. The apparatus of claim 4 wherein said insert member is a triangular-like pointed member connectable to said main blade member to pointedly dispose said blade assembly.

References Cited in the file of this patent

UNITED STATES PATENTS

| | | |
|---|---|---|
| 2,219,159 | Flynn et al. | Oct. 22, 1940 |
| 2,230,704 | Sorensen | Feb. 4, 1941 |
| 2,702,212 | McAneny | Feb. 15, 1955 |

FOREIGN PATENTS

| | | |
|---|---|---|
| 764,771 | Germany | Feb. 15, 1954 |